United States Patent [19]

Vodicska et al.

[11] Patent Number: 4,806,278

[45] Date of Patent: Feb. 21, 1989

[54] METHOD OF AND APPARATUS FOR SEGREGATING RADIOACTIVE IODINE ISOTOPES

[75] Inventors: Miklós Vodicska, Nagymaros; Nóra Vajda, Budapest; Péter Zagyvai, Budapest; József Solymosi, Budapest; Lajos G. Nagy, Budapest; Ernő Kulcsár, Budapest; Márta Takács, Budapest; Péter Ambrus, Budapest, all of Hungary

[73] Assignee: Budapesti Muszaki Egyetem, Hungary, Hungary

[21] Appl. No.: 89,141

[22] Filed: Aug. 25, 1987

[51] Int. Cl.⁴ .............................................. G21F 9/08
[52] U.S. Cl. .................................. 252/631; 376/310; 422/159; 423/2
[58] Field of Search ................. 252/631; 376/310, 313; 422/159; 423/2, 6

[56] References Cited

U.S. PATENT DOCUMENTS 2,859,093 11/1958 Russell et al. .......................... 423/6

Primary Examiner—Deborah L. Kyle
Assistant Examiner—Richard W. Wendtland
Attorney, Agent, or Firm—Handal & Morofsky

[57] ABSTRACT

The invention relates to a method of and apparatus for the regregation of radioactive iodine isotopes from fluid samples. The method consists in leading the degassed and in certain cases also otherwise prepared sample into a column filled with an amorphous solid medium for binding quantitatively the cations, fluoride anions and contaminations of colloidal state, then the effluent flow continuously through an energy-selective gamma detector and continuously recording the signals generated in the detector by the radioactive iodine isotopes. The proposed apparatus comprises a sampling unit (MV), a degassing vessel (G), fluid transfer pumps (P1, P2), pipings, cocks (CS), a bubble removing cell (BC), a column (K) with amorphous material filling, an energy-selective detector system (GD) for measuring gamma radiation, and a signal processing and recording unit (JR).

9 Claims, 2 Drawing Sheets

METHOD OF AND APPARATUS FOR SEGREGATING RADIOACTIVE IODINE ISOTOPES

BACKGROUND OF THE INVENTION

The invention relates to a method of and an apparatus for the quick and continuous segregation of radioactive iodine isotopes present in different fluid samples and especially in those taken from the primary coolant of the water-water-type nuclear power plants base on pressurized water reactors, primarily for analytical purposes. The radioactive concentration of iodine isotopes—being of high importance from technological and/or operational safety aspects—can directly be measured by means of the method proposed by the present invention and using a simple measuring method applied to liquid samples treated in the equipment realizing said method.

The radioactive iodine isotopes in the primary water circuit of the water-water-type nuclear power plants are fission products of the fuel. Their quantity (radioactive concentration), further the relative amounts of the various iodine isotopes with respect to each other, reliably indicate inhermeticity of the cladding of fuel elements, and sensibly follow the service condition of the reactor in its steady-state and transient periods of operation. Consequently, the qualitative and quantitative analysis of iodine isotopes constitute an important item of power-plane radio-analytics. The analysis—considering the above tasks—should be performed within shortest time possible, in continuous service and with good selectivity and sensitivity. A few theoretical and practical methods for the analysis of this kind are known for the isotopes $^{131}I$, $^{132}I$, $^{133}I$, $^{134}I$ and $^{135}I$ occurring in water-water-type nuclear power plants.

Soviet authors, V. V. Aksionov et al. have proposed in 1982 a method and equipment offering a partial solution of the above task. (Radiatsionnaya bezopasnost'i zashchita AES, Vol. 7. Energoisdat, Moscow, 1982; referred to in the INIS IAEA—in the International Nuclear Information System of the International Atomic Energy Agency, Vienna—under the number 15:014268). Their method is suitable for continuous detection of the radioactive concentrations of the $^{132}I$ and $^{134}I$ isotopes. By means of a special device, the intensity of gamma photons are measured, applying in the primary-circuit piping section two NaI(Tl) scintillation detectors operating in the given energy inverval in gated mode, making use of the emission of cascade gamma photons by isotopes $^{132}I$ and $^{134}I$. Correspondingly, the detectors are connected in coincidence connection to a suitably selected electronic signal processing unit. The measuring point is arranged between the cation and anion exchange resin columns of the water-cleaning equipment having its circuit partially arranged in the primary circuit, in order to reduce radioactivity resulting from the cations. The interference effects of some isotopes of short half-period (such as $^{16}N$, $^{17}N$) is eliminated by imposing a delay on the investigated samples, inserting a 10-minute by-pass section. By means of this method, the activity of $^{132}I$ and $^{134}I$ isotopes can be selectively measured, and a few per cent of overall activity is claimed as sensitivity limit.

T. Bereznai et al. (Energia és Atomtechnika, Budapest, 30, 1977, p. 38.) published method of and an apparatus equipment for solving the assumed radio-analytical tasks occurring in the PAKS Nuclear Power Plant of Paks (Hungary). The aim of the method is to provide continuous analyzis of the nuclides present in the primary-circuit coolant of the ractor, the determination of iodine isotopes being only a part of this overall task. The equipment incorporates detector systems permitting continuous measurements at two points, one at the inlet of the by-pass section serving for the specific purpose of the investigation, and the other at the absorbent placed into the flow of gases separated from the sample and drained. In the course of processing the sample, the iodine isotopes are bound by a "iodine filter" which has not been specified.

Aksionov and this co-workers claim their method to be suitable only for analyzing the two iodine isotopes mentioned above, whereas in the course of measurements aimed at checking reactor operation and safety, quantitative analysis of as many of the entire set of iodine isotopes as possible, preferably all of them, would be required. A further deficiency of the method lies in the unsatisfactory degree of obtainable selectivity and sensitivity. From among the detectors performing continuous measurements, incorporated in the equipment realizing the method developed by Bereznai and his co-workers, the detector directly measuring gamma-radiation of unprocessed samples is only suitable for the determination of the so-called matrix activity of isotopes representing the overwhelming part of radioactive concentration in the sample, and also its sensitivity to detect iodine isotopes is very poor. Any continuous measurement of the iodine content of the iodine filter would only ppermit the plotting of cumulated (integrated) radio-activity, and also the sensitivity of continuous measurements would be effected by the presence of effluent passing across the iodine filter and still containing a considerable part of matrix form activity.

In the course of developing the present invention, the aim has been to determine, in shortest time possible and continuously, the activity of iodine isotopes or some quantity proportional to their activity, in steady-state and transient operating conditions (i.e. during shut-down or start-up periods) of the reactor, said iodine isotopes being of outstanding importance from among all radioactive isotopes present in the primary coolant of the pressurized water nuclear reactors.

SUMMARY OF THE INVENTION

The idea of the invention is, in essence, the recognition that from liquid samples, containing beside iodine isotopes disturbing components: radio-active isotopes, components in gaseous phase, cations, fluoride anions and colloidal corrosion products present in the solution the iodine isotopes can be segregated quickly and continuously and held in the sample by means of gas rinsing and by letting the liquid medium pass through a column filled with amorphous zirconium phosphate or other high specific surface active solid medium, so that the rate and quantity of each iodine isotope can be determined selectively.

The method proposed by the present invention and serving for the segregation of radioactive iodine isotopes (especially from the primary-circuit coolants of pressurized water reactors of nuclear power plants) in the course of which the given gases (among others radioactive noble gases) are expelled from the sample taken continuously under suitable conditions and, in the given case pre-treated, by means of passing bubbles of some inert gas through the sample, and adjusting the pH-value of the sample to neutral or some suitable alkaline level, all that in some known way—is based on passing the sample at a suitably chosen flow rate—preferably resulting in a contant duration of about 5 to 15 minutes—through a column filled with amorphous zirconium phosphate or other active solid material for binding the cations, fluoride anions and colloidal-state contaminations, e.g. unsolved corrosion products; the effluent leaving the column and containing in considerable proportion iodine isotopes only—after a complete segregation period of about 20 minutes permitting the decay of radioactivity of the generally anionic isotopes having half-periods up to a few minutes only—is led through a gamma detector expediently of the flow-cell type, for continuous recording of the signals generated in the detector by the radioactive iodine isotopes, either in lumped form by means of a calibrated counter adjusted corresponding to the different gamma energies of the various iodine isotopes and operated in gated mode, or selectively, according to the gamma energy of each individual iodine isotope (expediently by means of at least one ratemeter coupled to the recorder).

The novel apparatus intended for accomplishing the method proposed by the invention comprises a sampling unit of continuous operation, providing samples of suitable pressure and temperature, a degassing vessel connected in series to the former through a piping, and provided with a nitrogen inlet producing gas bubbles in the just treated part of the sample, performing thereby its required mixing and also permitting level control, a liquid transfer pump also connected in series with the former, a reagent storage container arranged for being connectible to the continuously operated system through a piping and a cock and to be drained by means of a pump, a bubble removing cell connected in series to the liquid transfer pump through a piping, a separator column filled with amorph circonium phosphate connected in series to the former through a piping, a continuously operating, flow-type energy-selective detector system for measuring gamma radiation, connected in series with the former through a piping and, finally, connected to the detector, a signal-processing and recording unit.

BRIEF DESCRIPTION OF THE DRAWINGS

The method and apparatus complying with the invention is described in some detail in the following, with reference to an example, and the attached drawings. In the drawings

DESCRIPTION OF THE PREFERRED EMBODIMENTS

Figure 1:
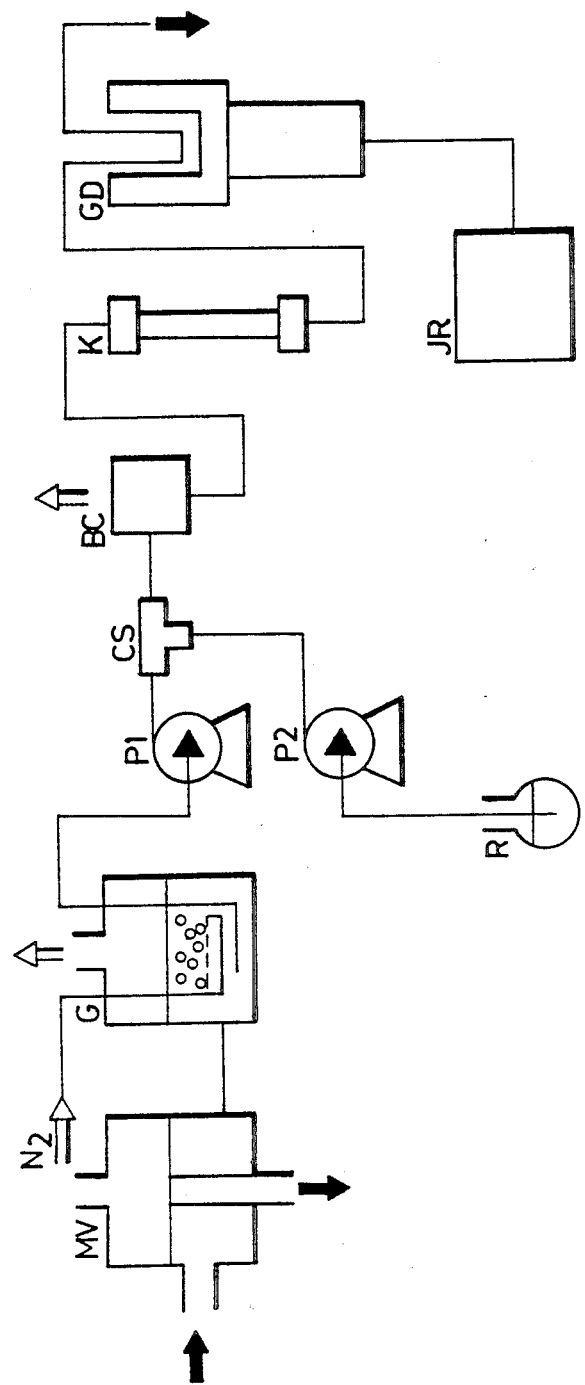
FIG. 1 shows the schematic diagram of an apparatus for realizing the method of the invention.

The apparatus proposed by the invention and capable of carrying out the method of segregating radioactive iodine isotopes (FIG. 1) comprises a sampling unit MV interconnected with a pipeline transporting a fluid medium containing among others radioactive iodine isotopes. Such pipeline can be the primary liquid coolant circuit of a pressurized water reactor serving as heat energy source of a water-water-type nuclear power plant. The sampling unit MV continuously takes samples of suitable pressure and temperature and passes them into a degassing vessel G having an inlet for introducing gas as nitrogen ($N_2$). The nitrogen bubbles ensure agitation of the treated sample and permit to control the liquid level in the vessel. The degassing vessel G is connected through a piping to a transfer pump P1 and thereby to a cock CS receiving appropriate reagent from a container R by means of a pump P2. The fluid sample mixed with the reagent in the cock CS is transported to a bubble removing cell BC wherefrom the mixture is transferred to a segregation column K containing a filling made of amorphous zirconium phosphate. The segregation column K is connected—again through a piping—to a continuously operating flow-type energy-selective gamma radiation detecting system GD and a signal processing and recording unit JR.

Instead of nitrogen it is possible to apply other appropriate inert gas. The degassing vessel G serves for expelling the gases dissolved in the sample (among them the radioactive isotopes of the noble gases). The pH-value of the samples taken is adjusted always to a neutral or alkaline level if necessary by means of the appropriate reagent placed in the container R. The samples treated in the required manner (having e.g. the required pH-value adjusted, being free of bubble and noble gases) are transported into the segregation column K with a speed ensuring full contact time generally from at least about 5 minutes to about 15 minutes. The active filling of the column containing high specific surface absorbent as zirconium phosphate is capable of binding the cations, fluoride anions and different colloid-state corrosion products from the sample. Before detecting the sample treated it flows about 20 minutes in order to premits the decay of the very short and short half-period radioactive isotopes remaining in the effluent in spite of the previous segregation steps and capable of disturbing the measurements related to iodine.

The samples are introduced into the radiation detecting system GD for detecting gamma radiation of different energy levels. In the fluid carrier medium they contain in considerable percentage the radioactive iodine isotopes only. The detection system includes calibrated counters operated in gated mode and adjusted according to the different gamma-energy levels of the different radioactive iodine isotopes in order to determine their radiation level.

Figure 2:
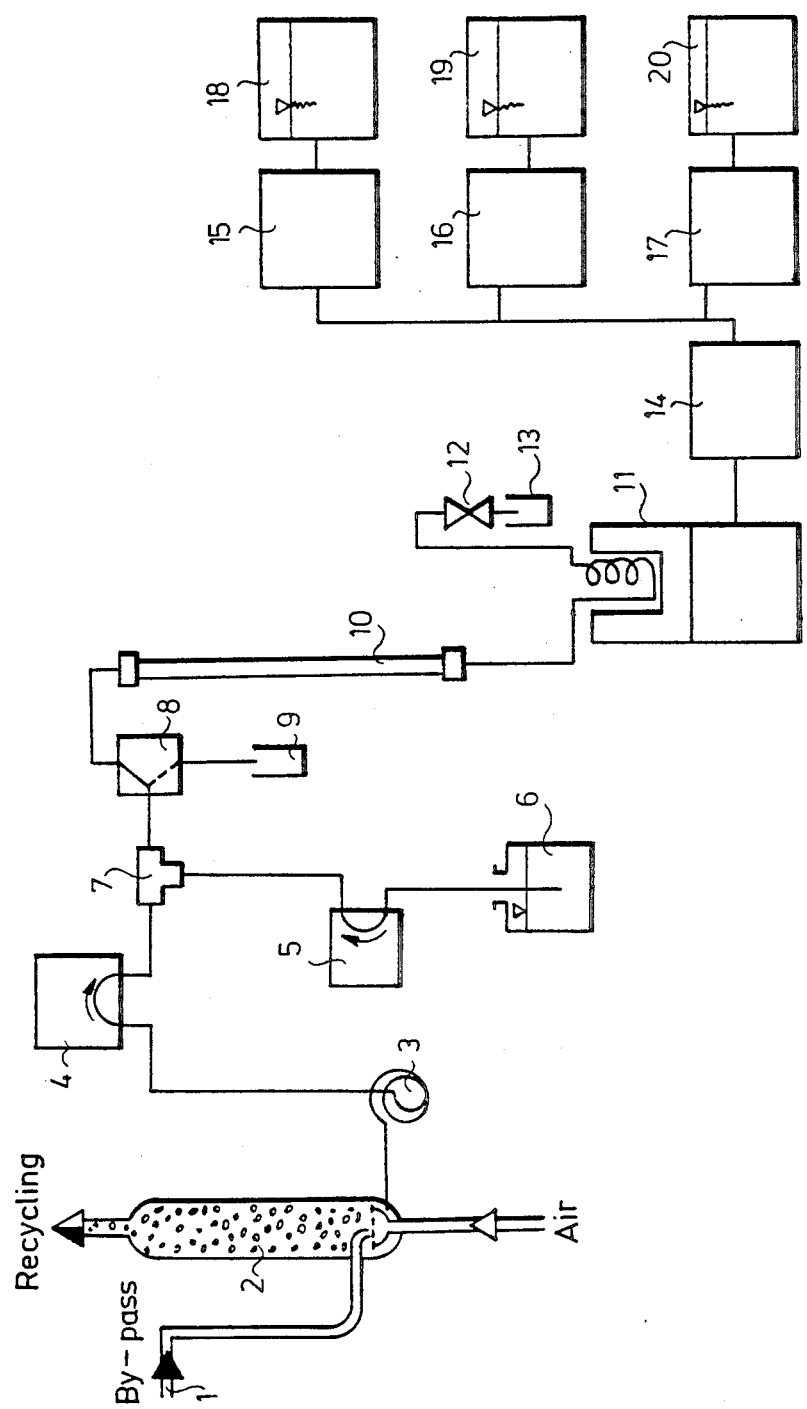
FIG. 2 is the diagram of a measuring system based on the present invention and realised in the nuclear power plant in Paks (Hungary).

With reference to FIG. 2 the following non-limiting example should be helpful in better understanding the essence of the invention.

EXAMPLE

A laboratory model was constructed for carrying out the method proposed by the invention. This model takes into account the specific conditions of the water-water-type nuclear power plant built-up in Paks (Hungary) operating with pressurized water nuclear reactors. The method should serve for measuring the radiation levels of the radioactive iodine isotopes in the primary coolant circuit of the Paks plant and it was realised in an arrangement shown in FIG. 2. The measurement was carried out as described here below.

The sample is cooled after taking and the cooled sample is led into a 1000 $cm^3$ glass bubbling vessel 2 at a flow rate of about 3 $cm^3$/min. At a flow rate of at least 10 $dam^3$/min, air is passed across a glass filter arranged at the bottom of the vessel 2. The surplus of the air/liquid mixture leaves the vessel at its top and enters a degassing unit, from where the part of the water sample is recycled into the primary circuit. From the noble-gas-free and bubble-free part of the solution collecting under the filter, the sample is pumped into a delay pipe section 3 by a peristaltic pump 4 at a flow rate of about 1 cm³/min. By another peristaltic pump 5 connected to an Y-pipe 7, suitable reagents can be fed from a reagent storage tank 6 into the sample, e.g. for adjusting its pH-value. Before segregation, a portion of the sample can be picked up in a sampling vessel 9 through a two-way cock 8 for the purpose of reference measurements. By setting the two-way cock 8 into its other position, the sample is led into a column 10 of 6 mm inner diameter, with the spaces between quartz wad filter beds being previously filled up with 10 g of amorphous zirconium phosphate. The effluent is led through a hollow NaI(Tl) scintillation detector 11 consisting of a teflon tube of 2 millimeter inner diameter and provided with a spirally arranged flow cell. From said detector the effluent gets through a shut-off cock 12 into a sampling vessel 13. The scintillation detector 11 obtains its supply voltage from an analyser 14. The energy selective signals of the scintillation detector 11 are led in a differential gated mode into counters or ratemeters 15, 16, 17 adjusted to the characteristic gamma lines of the iodine isotopes $131_I$, $132_I$ and $135_I$, then the signals of the counters or the analogue signals of the ratemeters are plotted in the function of time by recorders 18, 19 and 20.

The segregation of iodine isotopes by means of the method and apparatus proposed by the invention is in several aspects more advantageous than other methods known so far. After segregation—having determined its efficiency through checking measurements using semiconductor detectors—the sample solution containing iodine is—within the sensitivity limits of the measurement—free of N, O, Na and K matrix components, i.e. of cationoc radioactive components in general, and its content of noble gases and fluoride ions belonging to the matrix components is low enough to leave the sensitivity of the measurement uneffected even in reactor shutdown periods associated with very low radioactive iodine concentrations. The method leads itself to continuous and parallel measurement of preferably at least three iodine isotopes, and by inserting a required number of signal processing units (and respective circuit elements), simultaneous measurement of all occurring iodine isotopes is feasible. Also, the apparatus for implementing the method can be arranged to contain two segregating columns connected parallel, filled up with charges of identical composition, permitting regeneration of exhausted charge without interrupting continuity of measurement and continuous supervision of operation. The metod is economical, it is characterized by low demand on time and work, it is based on exclusively inexpensive and simple pieces of equipment, resulting in low installation and operating costs.

What we claim is:

1. A method of segregating radioactive iodine isotopes present in fluid samples, especially in those taken from the primary coolant circuit of a pressurized water nuclear reactor comprising the steps of:
   driving bubbles of a suitably chosen inert gas through a sample taken in a continuous process from a fluid medium to be investigated,
   expelling thereby the dissolved gases and among them radioactive noble gases from said sample,
   adding, if necessary, a reagent to said sample for adjusting its pH-value to neutral or an alkaline level,
   transporting said sample to a column filled with a high active surface material in order to bind quantitatively the cations, fluoride anions and colloidal-state corrosion products from said sample,
   letting said sample leaving said column to clear and permitting thereby the decay of short and very short half-period radioisotopes which may have remained in said sample during the previous steps,
   making the effluent leaving said column—containing between radioactive isotopes in considerable percentage iodine isotopes only—pass in continuous flow through an energy-selective gamma detector and
   continuously plotting the signals generated in said detector by the radioactive iodine isotopes.

2. A method according to claim 1, wherein for quantitative binding of the undesired components said sample is transported through said column from about 5 minutes to about 15 minutes.

3. A method according to claim 1, wherein said sample is cleared over about 20 minutes.

4. A method according to claim 1, wherein the signals generated by the radioactive iodine isotopes are plotted in integrated form by calibrated counters operated in gated mode and adjusted according to the different gamma-energy levels assigned to the various radioactive iodine isotopes.

5. A method according to claim 1, wherein the signals generated by the radioactive iodine isotopes are plotted selectively by means of at least one ratemeter adjusted according to the different gamma-energy levels assigned to the various radioactive iodine isotopes.

6. An apparatus for segregating radioactive iodine isotopes present in fluid sample, especially for use with samples taken from the primary coolant circuit of a pressurized water nuclear reactor, comprising a sampling unit for continuously taking and providing samples of suitable pressure and temperature, a degassing vessel connected through a piping with said sampling unit and equipped with a gas inlet for transporting appropriate neutral gas for agitating said sample, for expelling therefrom the undesired gaseous contaminations and for permitting level control of said sample, a transfer pump for forwarding said sample to a bubble removing cell, a segregation column filled with high specific surface active material for binding quantitatively the cations, fluoride anions and colloidal-state corrosion products present in said sample, a piping connected to an output of said segregation column to contain said sample during a predetermined time for letting the short and very short half-period radio-isotopes to decay before detecting said sample, a continuously operating flow-type energy-selective gamma-radiation detecting system for investigating said clear sample and a signal processing and recording unit for receiving the signals emitted by said detecting system.

7. An apparatus according to claim 6, further comprising a cock arranged between said transfer pump and said segregation column and connected to a pump for forwarding appropriate reagent, e.g. for adjusting the pH-value of said sample to neutral or an alkaline level, from a container to said cock.

8. An apparatus according to claim 6, wherein said segregation column is filled with amorphous zirconium phosphate.

9. An apparatus according to claim 6, comprising in said detecting system scintillation detectors connected to said signal processing and recording unit being capable of differentiating at least three specific gamma-energy levels of radioactive iodine isotopes.

* * * * *